(12) United States Patent
Schepperle

(10) Patent No.: US 7,418,884 B2
(45) Date of Patent: Sep. 2, 2008

(54) SWITCHING DEVICE

(75) Inventor: Bernd Schepperle, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 256 days.

(21) Appl. No.: 10/574,594

(22) PCT Filed: Sep. 15, 2004

(86) PCT No.: PCT/EP2004/010292

§ 371 (c)(1),
(2), (4) Date: Apr. 4, 2006

(87) PCT Pub. No.: WO2005/038308

PCT Pub. Date: Apr. 28, 2005

(65) Prior Publication Data

US 2006/0225528 A1    Oct. 12, 2006

(30) Foreign Application Priority Data

Oct. 13, 2003   (DE) ................................ 103 47 491

(51) Int. Cl.
*F16H 59/00*    (2006.01)
*F16H 61/00*    (2006.01)
*F16H 63/00*    (2006.01)

(52) U.S. Cl. .................. 74/335; 74/337.5; 74/473.1; 74/473.12; 74/473.13; 74/473.21

(58) Field of Classification Search ............ 74/335, 74/337.5
See application file for complete search history.

(56) References Cited

U.S. PATENT DOCUMENTS

| 4,784,007 | A | * | 11/1988 | Ishida et al. ............... 74/335 |
| 5,271,291 | A | | 12/1993 | Knape |
| 5,463,911 | A | | 11/1995 | Knoedel et al. |
| 5,724,856 | A | | 3/1998 | Back |
| 6,085,607 | A | * | 7/2000 | Narita et al. ............... 74/335 |
| 6,615,682 | B2 | | 9/2003 | Meyer et al. |
| 2002/0005079 | A1 | | 1/2002 | Paetzold |
| 2003/0066368 | A1 | * | 4/2003 | Koerber et al. ............. 74/335 |

FOREIGN PATENT DOCUMENTS

| DE | 2 317 725 | | 10/1973 |
| DE | 195 25 834 | A1 | 11/1996 |
| DE | 198 40 681 | A1 | 3/2000 |
| DE | 198 41 153 | A1 | 3/2000 |
| DE | 198 43 584 | A1 | 3/2000 |
| EP | 1 310 707 | A1 | 5/2003 |

* cited by examiner

*Primary Examiner*—David D. Le
(74) *Attorney, Agent, or Firm*—Davis Bujold & Daniels, P.L.L.C.

(57) ABSTRACT

A shifting device for shifting a transmission with a shifting shaft upon which a plurality of shifting forks are located in an axial, slidable manner for carry out desired shifting procedures. The shifting device includes a selection apparatus for choosing the shifting fork to be activated for carrying out the shifting procedure and a blocking mechanism, which prevents movement of each of the non-chosen shifting forks. The blocking mechanism is located on an additional shaft which extends parallel to the shifting shaft and supports elements of the selection apparatus. A first actuator axially displaces the shifting shaft, when carrying out of the shifting procedure, and another actuator causes the additional shaft to rotate for choosing a desired the shifting fork to carry out the shifting procedure and for preventing movement of non-chosen shifting forks.

17 Claims, 2 Drawing Sheets

SWITCHING DEVICE

This application is a national stage completion of PCT/EP2004/010292 filed Sep. 15, 2004 which claims priority from German Application Serial No. 103 47 491.9 filed Oct. 13, 2003.

FIELD OF THE INVENTION

The invention concerns a shifting device.

BACKGROUND OF THE INVENTION

For the shifting of a transmission, especially where vehicles are concerned, a shifting device is provided in the transmission, which aids in engaging individual gear stages. As this is done, it is possible that parts of the shifting device can be manually moved by the vehicle driver or as an alternate, this function may be carried out by actuators, which are energized by at least one auxiliary power medium to execute the necessary movements of parts of the shifting device required for the shifting of gear stages.

DE-A1 198 43 584 discloses a shifting apparatus for a multi-stage shifting transmission wherein, on a single shifting shaft, a multiplicity of shifting forks (or shifting levers (hereinafter "shifting forks") are placed. A means of selection enables the choice of one of the shifting forks by a turning of a shifting shaft. Alternately, if the shifting shaft is axially displaced, then the respectively selected shifting fork is activated to carry out the shifting action. A blocking shaft, placed parallel to the shifting shaft, is likewise rotated upon the turning of the shifting shaft and thereby, in its function as a blocking shaft, employing the prevention of movement of such shifting forks which were not chosen as indicated above. In spite of this well functioning shifting apparatus, problems still remain with regards to a lock-up of a shifting apparatus in an operation including actuators.

The purpose of the invention is to make a shifting apparatus known, which obviates the presently existing problems and which enables the functioning of actuators in a simple manner.

SUMMARY OF THE INVENTION

According to the invention, a shifting device for the shifting of a transmission possesses a shifting shaft upon which a multiplicity of shifting forks are placed in an axial, slidable alignment for the execution of shifting procedures. Likewise, a selection apparatus for the choice of one of the shifting forks out of the multiplicity of shifting forks and blocking disks for the prevention of an axial motion of the non-chosen shifting fork are provided. To accomplish this, the blocking apparatuses are placed on an additional shaft, essentially in parallel alignment with the shifting shaft. A first actuator is provided which axially displaces the shifting shaft for the execution of the of the shifting procedure. Additionally, elements are provided for the selection apparatus on the additional shaft. A further actuator is, likewise, provided which turns the additional shaft for the choice of a shifting fork and for the prevention of the movement of non-selected shifting forks.

In an advantageous embodiment, the elements of the selection apparatus make use of ring-shaped engagement units, specifically for each shifting fork. The ring-shaped engagement units are axially affixed and slidable along the shifting shaft to enable the execution of the shifting procedure. The ring-shaped engagement units are rotatable about the shifting shaft for the selection of one of the shifting forks and possess elements of a come-along apparatus, which enable an axial sliding of the ring-shaped engagement unit because of the axial motion of the shifting shaft in the shifting procedure.

Another advantageous embodiment demonstrates, that the ring-shaped engagement units on the shaping fork co-act with a blocking mechanism for prevention of axial motion of non-chosen shifting forks on the shifting shaft.

In a particularly advantageous embodiment, elements of the blocking mechanism incorporate rotatable blocking disks, the circumferences of which extend into an axial movement area of the ring-shaped engagement units. The contour of a blocking disk is designed in such a manner that the eliminated zone of the blocking disks, which is in segmental shape, allow an axial movement of the ring-shaped engagement units on the shifting shaft, while other areas of the blocking disks are appropriate for preventing an axial movement of the ring-shaped engagement units.

Advantageously, recesses are present on the ring-shaped engagement units, which recesses co-act with projections on the shifting shaft. The projections penetrate the recesses, if the associated shifting fork is not engaged and further the projections slide the ring-shaped engagement units axially if the selected shifting fork is in a displaced position which changes the gear stage.

Advantageously, the elements of the selection apparatus exhibit complementary toothings which mesh and enable a rotation of the elements of the selection apparatus in relation to one another. In this operation, only parts of the ring-shaped engagement unit possess toothing due to their formation.

Representing one embodiment, an area of a section in a blocking disk can exhibit a toothing, which can mesh into the toothing of a ring-shaped engagement unit.

An inventive embodiment would be especially advantageous, if the elements for the carrying out of shifting procedure were made of steel or aluminum, while the elements of the selection apparatus and of the blocking disks are constructed of aluminum or plastic or again from a combined compounding.

In the case of a particularly advantageous design of the invention, a transmission can be provided for ratio control of rotation of the shifting shaft actuator in an axial movement thereof.

Advantageously, at least one actuator is provided, which is designed to operate electromechanically, pneumatically or hydraulically.

BRIEF DESCRIPTION OF THE DRAWINGS

The invention will now be described, by way of example, with reference to the accompanying drawings in which.

DETAILED DESCRIPTION OF THE INVENTION

Figure 1:
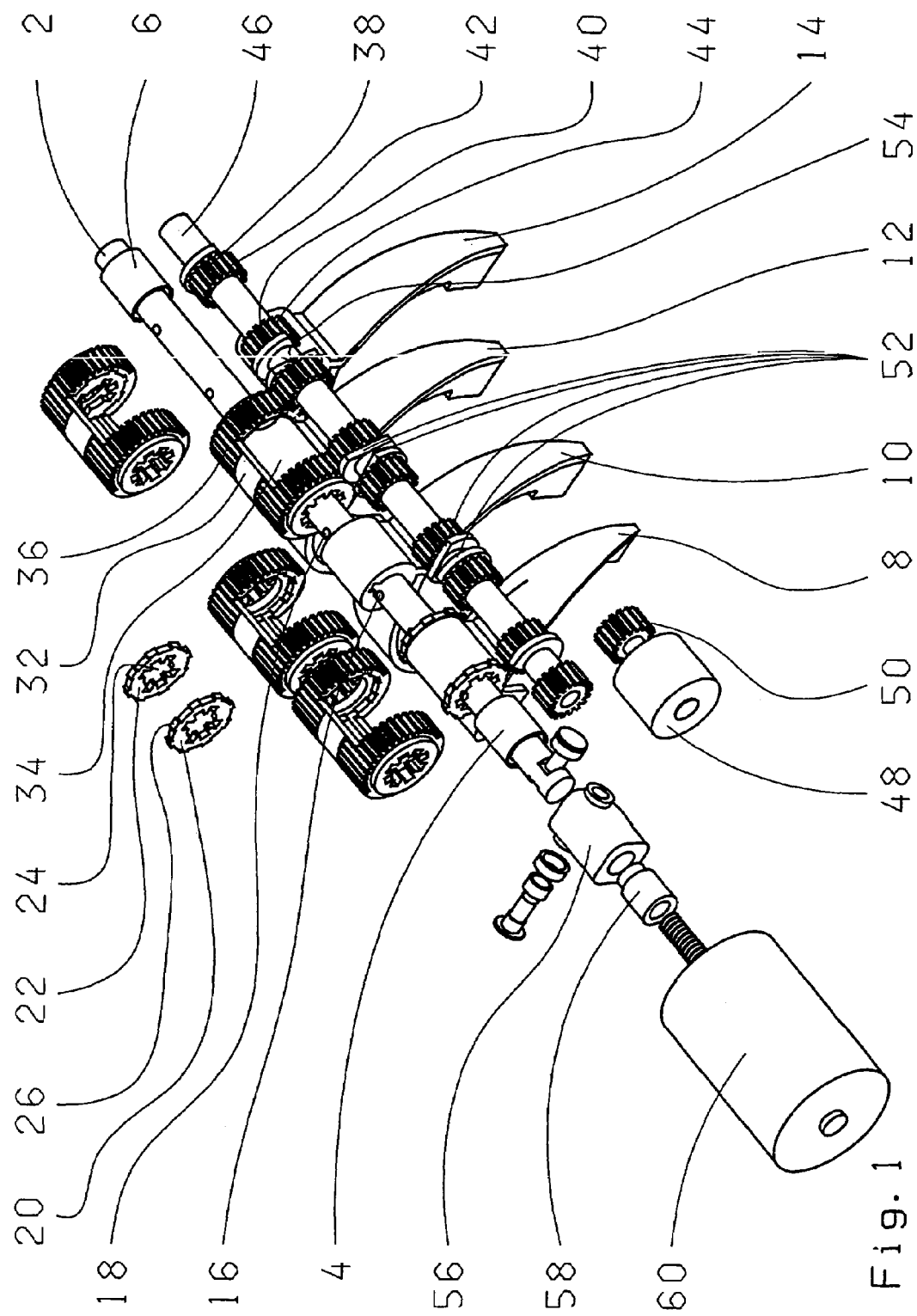
FIG. 1 is a first shifting device with individual elements.

According to FIG. 1, four shifting forks, namely 8, 10, 12 and 14 are placed on a shifting shaft 2. Shifting shaft 2 is axially slidably supported in bearings 4 and 6 which, in turn, are affixed in a housing (not shown) of the shifting transmission. The shifting forks 8, 10, 12 and 14 are installed so as to be moveable in relation to the shifting shaft 2. For the purposes of clarity of illustration and better understanding, not all possible shifting forks are shown on the shaft 2. Further, individual elements of the shifting device are presented in a somewhat exploded view separate from the shifting shaft. In a completed assembly, however, all shifting forks are located in a manner similar to that of shifting fork 12, which is shown on the shifting shaft 2. Presented in FIG. 1 is an arrangement of the three shifting forks 8, 10 and 12 of the shifting shaft 2, while the shifting fork 14, is placed in this arrangement underneath the shifting shaft 2. The following components, described here, serve analogously for every shifting fork, if these also can be described and explained by a single typical shifting fork because of common characteristics.

On the shift fork 10, the shifting shaft 2 possesses projections in the form of two pins 16 and 18, which enclose the shifting fork 10 between them. Between the pins 16 and 18 and the shifting fork 10 is to be found at each side of the shifting fork 10, one sheet metal, contoured disk 20 and 22. The contoured disks 20 and 22 are bounded on their inner circumference by similar openings 24 through which the pins 16 and 18 can be axially inserted, respectively. The remaining area between each of the openings 24, bounded by the inner circumference of the contoured disk 20 and 22 is able, by a mutual turning of the contoured disk 20 and 22 on the shifting shaft 2 with the aid of the pins 16 and 18, to make a mutual overlap. Thereby, in a case of an axial movement of the shifting shaft 2 over the pin 16 and 18 wherein the contoured disk 20 and/or 22 and even the shifting fork 10 is axially displaced and a gear stage can be engaged in the transmission.

In order to turn the contoured disk 20 and 22 on the shifting shaft 2, this disk possesses on a contour surface (hereinafter "contour 26") on its outer circumference which co-acts with a complementary contour on a ring-shaped engagement unit 28 and/or 30 and forms a turn-fast connection between the contoured disks 20 and 22 and the ring-shaped engagement unit 28 and/or 30.

Such a device, basically including a ring-shaped engagement unit 32, is pictured in its location on the shifting fork 12, wherein currently two single, ring-shaped engagement units are combined to form one component. In order to enable a rotation of the ring-shaped engagement unit 32 on the shifting shaft 2, without interfering with the arms of the shifting fork 12, the ring-shaped engagement unit 32 is furnished with a recess 34. On the outer circumference of the ring-shaped engagement units 28, 30, 32 is provided a toothing 36, which can stand in engagement with corresponding toothings 38, 40 on gears 42 and 44. This is correspondingly valid for all shifting fork 8, 10, 12 and 14. The gears 42 and 44 are turn-fast affixed on a shaft 46, which is essentially aligned parallel to shifting shaft 2. The shaft is rotated by an actuator 48 such as, for example, an electric motor through a ratio train with a toothing 50. The arrangement, however, can also be so designed so that the actuator 48 is directly bound to the shaft 46 without the ratio train. Laterally, located to the gears 42 and 44 is respectively a blocking disk 52 of a blocking apparatus, which does not possess a complete, circular circumference, but has a recess in the form of the circular segment 54.

The blocking disks 52 of the differing shifting forks 8, 10, 12, 14 also exhibit such segmental cutoffs at various positions on their circumferences, so that the two blocking disks 52 always present the same cutoffs to one shifting fork, while otherwise, the cutoffs on the blocking disks 52 of the other shifting forks are provided for rotation about the axis of the common shaft 46. The blocking disks 52 co-act with the ring-shaped engagement units 28, 30, 32 to form the blocking apparatus, for example by the edges of the toothings of the ring-shaped engagement unit 28, 30, 32. In this way, the blocking disks 52 restrain the ring-shaped engagement units 28, 30, 32 and therewith also hold the shifting forks in their axial positions on the shifting shaft 2 and permit only an axial movement of the currently selected shifting fork, in the area of the segment 54 on the blocking disk 52.

The shifting shaft 2 is connected to an actuator 60 by way of a transfer block 56 having a ball-joint drive 58 which is, in turn, connected to an electric motor. Instead of the ball drive 58, this power transfer can be accomplished by a gear drive (not shown). The illustrated actuators 48 and 60 are shown in FIG. 1 as being co-axial, or axis parallel to the shaft of 2 and 46 which is to be placed in motion. By way of an appropriate directive gear drive, the possibility exists that an assembly, which stands at an angle to the shaft, may also be installed, for instance, at a right angle.

In order to shift a gear stage, it is necessary that the shifting fork 8, 10, 12 or 14 be pushed axially. The shifting fork 8, 10, 12 and 14 are freely supported on the shifting shaft 2 and for engagement, these must be axially shape-fit with the shifting shaft 2 by the pins 16, 18 and the contoured disk 20, 22. The toothed ring-shaped engagement units 28, 30, 32 are rotated by the shaft 46, which shaft is provided with gears 42, 44. The shifting shaft 2 moves itself for the engagement of the gear stages only in the axial direction. The selective preliminary choice of the gear stage to be shifted is carried out in that the contoured disk 20, 22 are rotated by the ring shaped engagement units 28, 30, 32 which encompass them and thereupon close a discrete angle. Analogous to this angle, the internal opening 24 in the contoured disks 20, 22 are provided which, by way of the non-shifted gear stages, as soon as the shifting shaft moves itself, lead to an engagement of the pins 16 and/or 18 and thereby to no correspondingly movement contoured disk of the corresponding shifting fork. In the case of the fork to be shifted, which is in this position, its necessary contoured disk 20 and/or 22 lacks the internal opening 24, so that the fork undergoes an axial movement and the desired gear stage is engaged. In each of the different selection positions, there is always one contoured pair 20, 22 without internal openings 24 in overlap with the pins 16, 18 so that an action can be initiated. All of the rest of the ring-shaped engagement units are coinciding with the internal openings 24 with the appropriate pins 16, 18 and no axial motion can occur.

Figure 2:
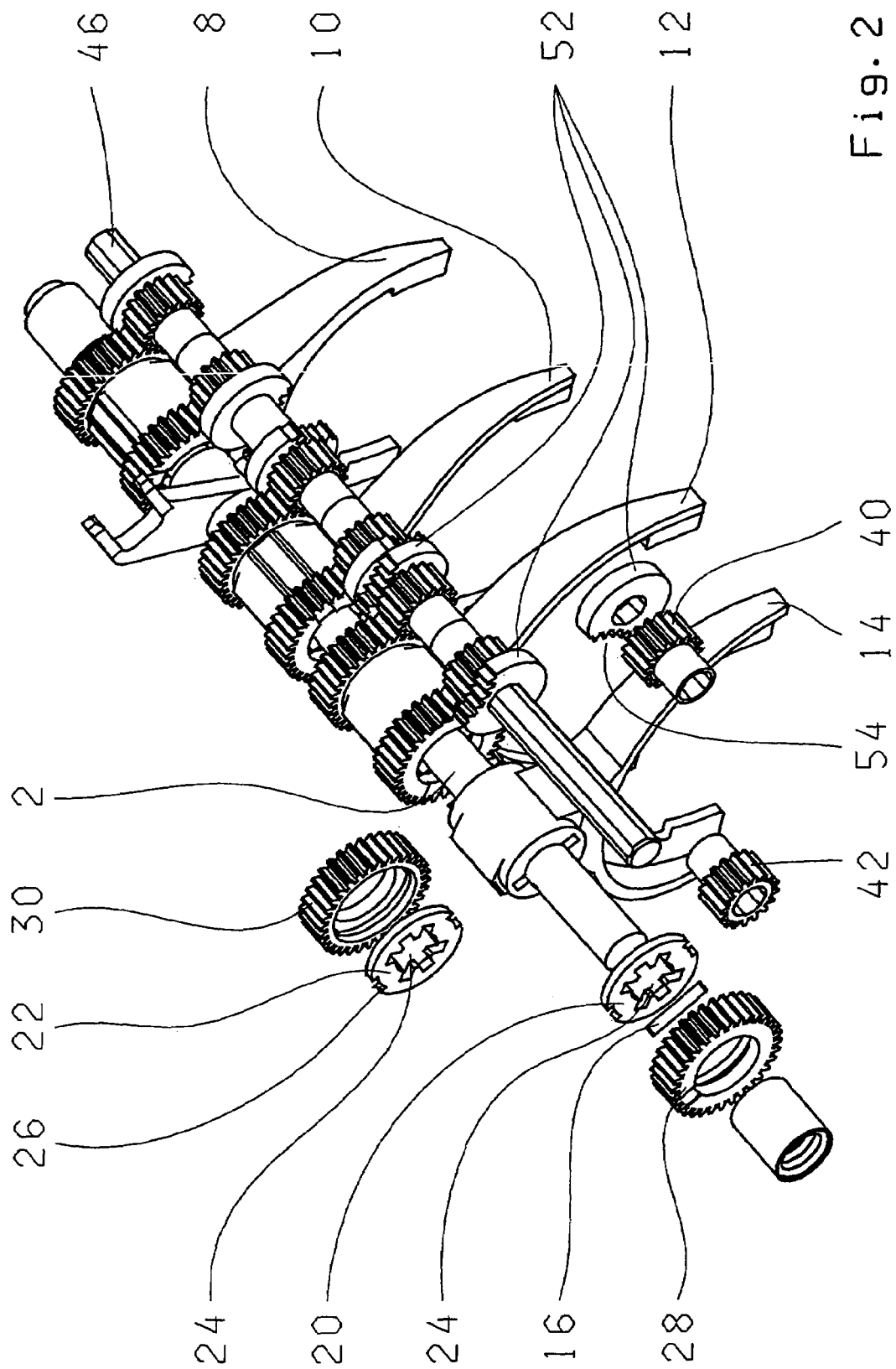
FIG. 2 is a second presentation of detailed elements of a second embodiment of the shifting device.

FIG. 2 shows a shifting device, according to FIG. 1, in a partially released condition. In this case, the segments 54 on the blocking disks 52 are provided with a toothing, so that the blocking disks in the non-blocking angular position can mesh into the outer toothing of the appropriate ring-shaped engagement unit 28, 30. The ring shaped engagement units 28, 30 are designed here as separate components so that the necessity of the formation of toothing 36, as is required with the ring-shaped engagement unit 32, is eliminated.

Since the elements taking part in the selection of the shifting fork to be shifted are exposed only to comparatively small forces, the design of these elements finds that a construction material of a lesser structural strength will suffice. Such a material would be plastic or a metal other than steel, but possibly including aluminum. Aluminum, in comparison to steel, is a low strength metal and plastic, both in comparison to steel and aluminum, is in turn a material of lesser strength.

Appropriate for a plastic construction, in the present embodiment, is the ratio determining stage with the toothing 50 to which can be added the shaft 46 and the gears 42, 44 and the blocking disks 52 which are on the shaft 46. Likewise, the ring-shaped engagement units 28, 30, 32 can be made of plastic, both in the assembled state as well as in the separate part versions. The elements of plastic can be pre-manufactured and require no or only minuscule reworking. This is thereby essentially cheaper than the construction materials for systems built of greater structural strength. A further advantage can be found where the elements made of plastic produce a lesser generation of noise, since plastic essentially possesses a noise dampening function. Known to the present time, and generally criticized noise problems, such as rattling in the transmission and scraping of gears can be avoided by the above system.

REFERENCE NUMERALS 2 shifting shaft
4 bearing
6 bearing
8 shifting fork
10 shifting fork
12 shifting fork
14 shifting fork
16 pin
18 pin
20 contoured disk (externally)
22 contoured disk (externally)
24 internal opening of 20, 22
26 contour at outer circumference
28 ring-shaped engagement unit
30 ring-shaped engagement unit
32 ring-shaped engagement unit
34 recess
36 toothing
38 toothing
40 toothing
42 gear
44 gear
46 shaft
48 actuator
50 toothing
52 blocking disk
54 segment
56 transfer block
58 universal ball-joint
60 actuator

The invention claimed is:

1. A shifting device for shifting a transmission, the shifting device comprising:
   an axially slidable shifting shaft (2) supporting a plurality of shifting forks (8, 10, 12, 14) which are each one of axially slidable relative to the shifting shaft (2), when the shifting fork (8, 10, 12 or 14) is blocked, and carried axially along with the shifting shaft (2), when the shifting fork (8, 10, 12, 14) is selected, for carrying out a desired shifting procedure,
   a selection apparatus (28, 30, 32, 42, 44, 46) for selecting a desired one of the plurality of shifting forks (8, 10, 12, 14) to carry out the shifting procedure, and
   blocking apparatuses (52) for preventing movement of non-selected shifting forks (8, 10, 12, 14), the blocking apparatuses (52) being supported on a substantially parallel, additional shaft (46),
   a first actuator (60) being provided, which axially displaces the shifting shaft (2) for carrying out the shifting procedure,
   elements of the selection apparatus (42, 44) being supported on the additional shaft (46), and
   an additional actuator (48) being provided for rotating the additional shaft (46) and selecting the desired one of the plurality of shifting forks (8, 10, 12, 14) to slide axially along with the shifting shaft (2) and for prevention of axial movement of the non-selected shifting forks (8, 10, 12, 14) as the shifting shaft (2) slides axially.

2. The shifting device according to claim 1, wherein the elements of the selection apparatus include, for each shifting fork (8, 10, 12, 14), a ring-shaped engagement unit (28, 30, 32) which is axially affixed with the shifting fork (8, 10, 12, 14) and is slidable with the shifting shaft (2) for carrying out the shifting procedure, and is rotatable about the shifting shaft (2) for selecting of one of the plurality of shifting fork (8, 10, 12, 14) and have elements of a come-along apparatus (20, 22), which enable axial displacement of the ring shaped engagement units (28, 30, 32) by axial movement of the shifting shaft (2) for carrying out of the shifting procedure.

3. The shifting device according to claim 1, wherein ring shaped engagement units (28, 30, 32), on the shifting fork (8, 10, 12, 14), interact with the blocking apparatuses (52) for preventing of axial movement of the non-selected shifting forks (8, 10, 12, 14) on the shifting shaft (2).

4. The shifting device according to claim 1, wherein contoured disks (20, 22) have cutouts (24) for ring-shaped engagement units (28, 30, 32), which coact with projections (16, 18) on the shifting shaft (2) such that the projections (16, 18) pass through the cutouts (24), if a corresponding shifting fork (8, 10, 12, 14) is not shifted and the projections (16, 18) abut against and push the contoured disks (20, 22) axially, if the selected shifting fork (8, 10, 12, 14) is selected.

5. The shifting device according to claim 1, wherein the elements of the selection apparatus (28, 30, 32, 42, 44, 46) have teeth (36, 38, 40), which mutually mesh and enable rotation of the elements of the selection apparatus (28, 30, 32, 42, 44, 46) with respect to each other.

6. The shifting device according to claim 1, wherein only a part of ring-shaped engagement unit (32) has teeth (36).

7. The shifting device according to claim 1, wherein elements (2, 8, 10, 12, 14, 20, 22) for the carrying out of the shifting procedure are manufactured from one of steel and aluminum.

8. The shifting device according to claim 1, wherein the elements (28, 30, 32, 42, 44, 46) of the selection apparatus are manufactured from one of aluminum and plastic.

9. The shifting device according to claim 1, wherein elements (52) of the blocking apparatus are manufactured from one of aluminum and plastic.

10. The shifting device according to claim 1, wherein a transmission unit (58) is provided for converting rotational motion of the actuator (60) into an axial motion of the shifting shaft (2).

11. The shifting device according to claim 1, wherein the first actuator (60) is one of an electro-mechanical, a pneumatic, and a hydraulic actuator which facilitates shifting of the shift device.

12. The shifting device according to claim 1, wherein elements of the blocking apparatus include rotatable blocking disks (52) which have inwardly extending circumferential surfaces, located in an axial movement zone of ring-shaped engagement units (28, 30, 32), and contoured such that a segment (54) of the blocking disks (52) permits axial movement of the ring shaped engagement units (28, 30, 32) with the shifting shaft (2), while a remaining portions of the blocking disks (52) prevent axial movement of the ring-shaped engagement units (28, 30, 32).

13. The shifting device according to claim 12, wherein an area of the blocking disks (52), designed as a cutout, has teeth which can mesh with teeth of the ring-shaped engagement unit (28, 30).

14. A shifting device for shifting a transmission having a shifting shaft (2) supporting a plurality of shifting forks (8, 10, 12, 14) that are one of block and axially slidable along with the shifting shaft (2) for carrying out a shifting procedure, a selection apparatus (28, 30, 32, 42, 44, 46) for selecting a desired one of the plurality of shifting forks (8, 10, 12, 14) to carry out the shifting procedure and blocking apparatuses (52) for preventing movement of non-selected shifting forks (8, 10, 12, 14), the blocking apparatuses (52) being placed on a substantially parallel, additional shaft (46), an actuator (60) being provided, which axially displaces the shifting shaft (2) for carrying out the shifting procedure, elements of the selection apparatus (42, 44) are provided on the additional shaft (46), and an additional actuator (48) is provided to rotate the additional shaft (46) for selecting one of the plurality of shifting forks (8, 10, 12, 14) and for prevention of movement of the non-selected shifting forks (8, 10, 12, 14), and the elements of the selection apparatus (28, 30, 32, 42, 44, 46) have teeth (36, 38, 40) which engage and enable rotation of the elements of the selection apparatus (28, 30, 32, 42, 44, 46) with respect to each other.

15. The shifting device according to claim 14, wherein at least one of the elements of the selection apparatus (28, 30, 32, 42, 44, 46) is a ring-shaped engagement unit (32) and only a portion of the ring-shaped engagement unit (32) has teeth (36).

16. The shifting device according to claim 15, wherein the blocking apparatuses (52) are disks that have a cutout which have teeth which engage with the teeth of the ring-shaped engagement unit.

17. A shifting device for shifting a transmission, the shifting device comprising:

an axially slidable shifting shaft (2) supporting a plurality of shifting forks (8, 10, 12, 14) which are each one of axially slidable relative to the shifting shaft (2), when the shifting fork (8, 10, 12 or 14) is blocked, and carried axially along with the shifting shaft (2), when the shifting fork (8, 10, 12, 14) is selected, for carrying out a desired shifting procedure;

a selection apparatus (28, 30, 32, 42, 44, 46) for selecting a desired one of the plurality of shifting forks (8, 10, 12, 14) to carry out the shifting procedure;

blocking disks (52) for preventing movement of non-selected shifting forks (8, 10, 12, 14), and the blocking disks (52) being supported on a substantially parallel, additional shaft (46);

a first actuator (60) being provided, which axially displaces the shifting shaft (2) for carrying out the shifting procedure;

elements of the selection apparatus (42, 44) being supported on the additional shaft (46); and an additional actuator (48) being provided for rotating the additional shaft (46) and selecting the desired one of the plurality of shifting forks (8, 10, 12, 14) to slide axially along with the shifting shaft (2) while the blocking disk prevent axial movement of the non-selected shifting forks (8, 10, 12, 14) as the shifting shaft (2) slides axially.

* * * * *